March 11, 1947.                E. F. W. ALEXANDERSON                2,417,229
                                  ELECTRIC COMPUTER
                          Filed April 17, 1942           2 Sheets-Sheet 1
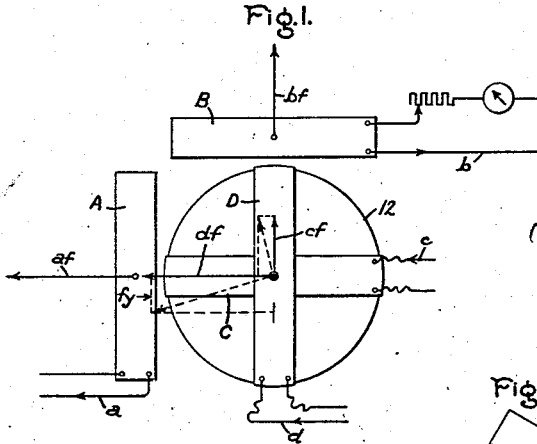
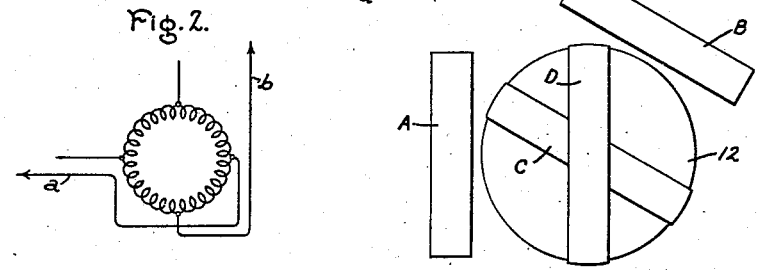
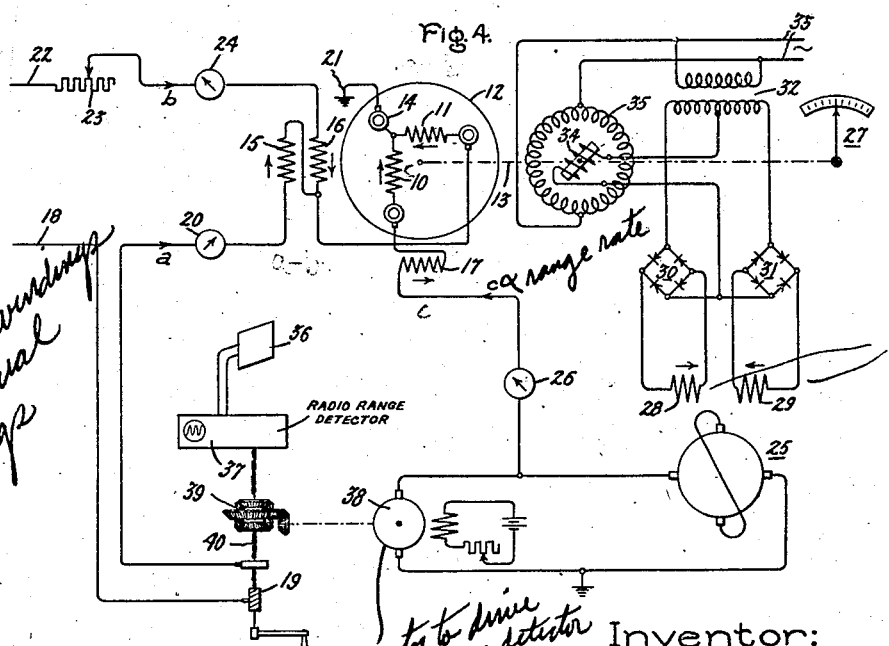
Inventor:
Ernst F. W. Alexanderson,
by Harry E. Dunham
His Attorney.

March 11, 1947.  E. F. W. ALEXANDERSON  2,417,229
ELECTRIC COMPUTER
Filed April 17, 1942   2 Sheets-Sheet 2

Inventor:
Ernst F. W. Alexanderson,
by Harry E. Dunham
His Attorney.

Patented Mar. 11, 1947

2,417,229

UNITED STATES PATENT OFFICE 2,417,229

ELECTRIC COMPUTER

Ernst F. W. Alexanderson, Schenectady, N. Y., assignor to General Electric Company, a corporation of New York Application April 17, 1942, Serial No. 439,404

10 Claims. (Cl. 235—61)

My invention relates to electrical computing apparatus by means of which equations having various known and unknown factors may be solved electrically and the result made manifest by means of an output voltage or current, a torque, a deflection and the like. The output may be amplified and used for regulating purposes including automatic regulation of the unknown quantity of the equation to bring about a balanced condition where the equation is solved. The factors of the equation may be introduced into the electrical computer in the form of electrical currents or partially mechanically as by a torque on the computer shaft.

In carrying my invention into effect in its preferred form I make use of an electric torque instrument or machine which may resemble a quarter phase motor but with quadrature displaced energizing windings on both stator and rotor. Currents corresponding to equation factors are fed into these windings in such a way that opposed torques, representing different sides of the equation to be solved, are produced.

An unbalance of the opposed torques indicates inequality in the two sides of the equation and produces turning of the rotor of the instrument, which turning motion may serve to regulate the current corresponding to an unknown factor and which is thus varied until the torques balance and the equation is solved. In order to obtain good sensitivity of the torque balancing instrument it is generally desirable to amplify the response before reintroducing the regulated current back into instrument. Such amplification is also desirable where the regulated current is used for operating other apparatus in accordance with the solution of the equation. The number of stator and rotor windings used on the torque balancing instrument will depend on the number and complexity of the equation factors involved. Also, certain equation factors may be introduced mechanically as by a torque produced by a spring or weight.

The features of my invention which are believed to be novel and patentable will be pointed out in the claims appended hereto. For a better understanding of my invention reference is made in the following description to the accompanying drawings.

Figure 5:
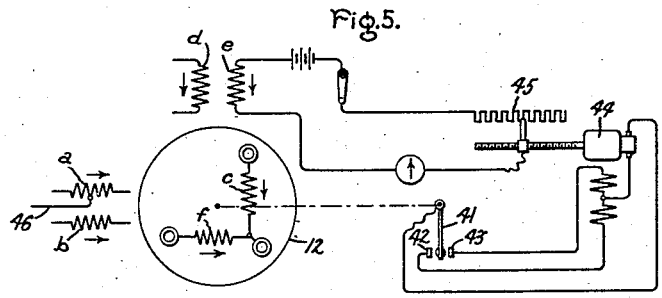
Figure 6:
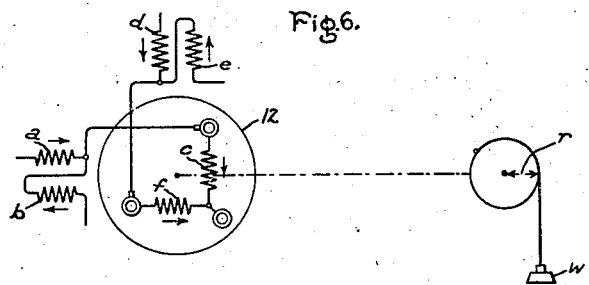
Figure 7:
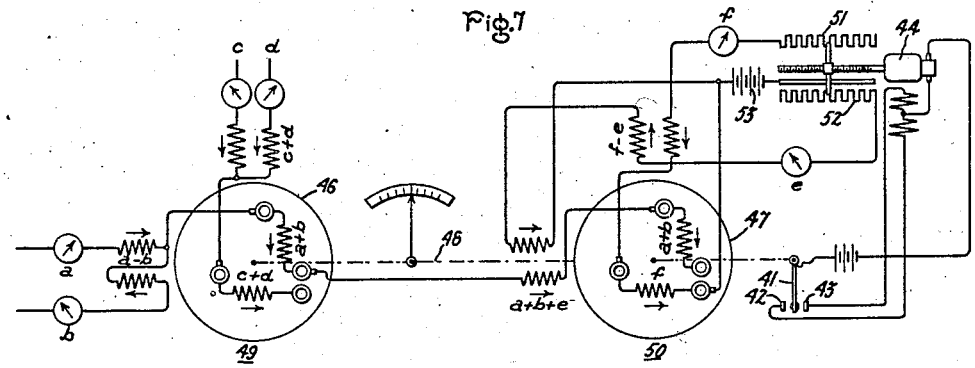

Fig. 1 represents a simple form of my invention for the purpose of explaining the principles involved. Fig. 2 represents a modified form of stator winding that may be used in Fig. 1. Fig. 3 represents the winding axes of stator and rotor in other than quadrature relation. Fig. 4 represents the practical application of my invention to the regulation and control of range computing apparatus which is useful in military work. Fig. 5 represents a modification with a simplified form of regulator. Fig. 6 illustrates how the electrical computor may be supplemented by means of a mechanical torque device, the mechanical torque representing one of the computing factors, and Fig. 7 illustrates an embodiment of the invention where two electrical computors are combined and also illustrating the reverse automatic regulation of two of the equation currents.

Assume that in Fig. 1 we have a torque device comprising cooperating stator and rotor members each provided with energizing windings distributed in slots of magnetic core structures conforming in general to conventional miniature dynamo electric machine practice. The flux axes of the stator and rotor energizing windings all lie in the same plane perpendicular to the axis of rotation. Only the windings A and B of the stator structure are shown to emphasize that such windings are wound to produce fluxes in different axes which in this case are at right angles, sometimes referred to as quadrature axes. Such stator may be similar to the stator primary member of a quarter phase motor. The rotor 12 is also provided with quadrature energizing windings C and D. The relation between the number of turns in the several windings is known and for simplicity I will assume that all of the windings have the same number of turns. Assume now that the several windings be energized with currents so that fluxes will be produced by the different windings of a magnitude and direction determined by the magnitude and direction of the energizing currents. I will call the energizing currents for coils A, B, C, and D, $a$, $b$, $c$, and $d$, respectively, and the corresponding fluxes $af$, $bf$, $cf$ and $df$ and represent the direction and relative magnitude of these fluxes by full line vectors projecting from the centers of the coils which produce them. Let it be assumed that currents $a$, $b$, $c$, and $d$ represent values of computing factors, also that the values of the $a$, $c$ and $d$ currents are determined by conditions under which we have no control, and that we wish to regulate $b$ to satisfy the equation $ac=bd$ so that $$b=\frac{ac}{d}$$

The rotor 12 is freely rotatable over a range which may be less than 90 degrees. Fig. 1 represents the position of the rotor in what may be called its center position, which is the position it will assume when the equation is satisfied. The fluxes $af$ and $cf$ will produce a counterclockwise torque proportional to their product. Also, the fluxes $bf$ and $df$ will produce a clockwise torque proportional to their product. Hence when these opposing torques are equal and the rotor is in the position shown $af \times cf = bf \times df$ and $ac = bd$ or $$b = \frac{ac}{d}$$

Current $b$ may be adjusted until this condition is satisfied and if desired the current values may be measured.

This balanced equation condition is strictly true only when the rotor, being free to turn, is in the central position shown or another rotor position 180 degrees from that shown, because both stator windings are inductively related to both rotor windings except in such positions, and this inductive relation varies with rotor position as will now be explained.

It will be noted that with the rotor in the central or full line position shown, flux $af$ is in line with flux $df$. Hence there is no torque reaction between these fluxes and the entire counterclockwise torque is produced by fluxes $af$ and $cf$. Likewise, stator flux $bf$ and rotor flux $cf$ are in line and hence produce no torque either clockwise or counterclockwise. Thus the clockwise and counterclockwise torques are produced purely by the $af \times cf$ and the $bf \times df$ fluxes respectively.

Assume now the rotor is forcibly turned slightly in a counterclockwise direction so that the rotor fluxes are shifted to the dotted line positions. Now both rotor fluxes have out of line components with both stator fluxes. Stator flux $af$ produces a counterclockwise torque with the slightly reduced right angle component of rotor flux $cf$ and also a clockwise torque with the now out of line component $fy$ of rotor flux $df$. Stator flux $bf$ produces clockwise torque with slightly reduced right angle component of rotor flux $df$ and also a clockwise torque with the now out of line component of rotor flux $cf$. The resultant clockwise and counterclockwise torques vary as sine waves with rotor displacement. Such waves are displaced from each other by 90 degrees of rotor displacement. The resultant torque may be represented by a sine wave which has zero value at the center rotor position.

The result of forcibly displacing the rotor from its center position is that the clockwise and counterclockwise torques are unbalanced and the rotor, if freed, will return to the center or balanced torque position corresponding to the position of the full line rotor flux vectors. Also, it will be apparent that to obtain a balance of the clockwise and counterclockwise torques in the off-center position of the rotor the relation between the exciting currents will have to be changed so that $ac$ no longer is equal to $bf$. Hence, it is apparent that any free off-center position of the rotor indicates an unbalance of the equation. It is also noted that the magnitude of the off-center position will be an indication of the magnitude of the unbalance and the direction of the rotor from off-center an indication of the direction of unbalance. These conditions hold regardless of the direction of unbalance. These conditions hold regardless of the relative magnitudes of the currents $a$, $b$, $c$ and $d$. Thus the equation is satisfied where $a=10$, $b=5$, $c=5$ and $d=10$ or where $a=7$, $b=1$, $c=9$ and $d=63$, etc.

The form of the windings may vary considerably, for example, the stator may have a simple ring winding energized by the $a$ and $b$ currents at 180 degree points as represented in Fig. 2, if the $a$ and $b$ energizing circuits are otherwise separated. The flux produced in any axes of the stator and rotor may be produced by a plurality of exciting currents where additional component factors are required and examples of this will be given. While the quadrature relation of the stator and rotor winding axis is the most efficient arrangement, the invention is not limited thereto. For example, the windings of Fig. 1 may be shifted by a like amount in stator and rotor as shown in Fig. 3.

Having explained the general principles of my computer, I will now proceed to explain some practicable uses therefor.

In range calculations used in military work it becomes desirable to solve equations of the form $a^2 - b^2 = c^2$ where $a$ represents the target velocity which is unknown, $b$ represents the observed angular velocity of the target and $c$ represents the range rate from which future range settings can be made. The equation may be rewritten thus: $(a-b)(a+b) = c^2$. In Fig. 4 I have represented apparatus for solving the equation for the purpose of determining the range rate.

In Fig. 4, 10 and 11 represent equal windings wound in a quadrature angular relation on a rotary core member represented at 12 on a shaft 13. These rotor windings are suitably connected to slip rings or flexible leads so as to connect with external circuits; one of the slip rings represented at 14 may serve as a common connection to both rotor windings. The stator member of this machine has equal windings 15, 16 and 17, windings 15 and 16 being wound in the same axis and winding 17 in a quadrature axis with respect to windings 15 and 16. The stator and rotor have magnetic core structures and the windings may be distributed in slots therein as in the structure of a dynamo electric machine. Stator winding 15 is energized by a current $a$ from a line 18 which current is adjustable by a resistance 19 and can be measured by an ammeter 20. The connections are such that current $a$ also flows through rotor winding 11 to a ground connection at 21, it being assumed that the other side of the source from which current $a$ is derived is likewise grounded. A current $b$ from a line 22 is used to energize stator winding 16 and also rotor winding 11. This current is adjustable by a regulator 23 and may be measured by an ammeter 24. It will be noted that currents $a$ and $b$ traverse the windings 15 and 16 in opposite directions and will therefore produce a stator flux in this axis equivalent to their algebraic sum $a-b$. Also, these currents traverse rotor winding 11 in the same direction and will, therefore, produce a rotor flux equivalent to $a+b$. These fluxes give rise to a rotor torque which we will assume to be in a counterclockwise direction and equivalent to $(a-b)(a+b)$.

Stator winding 17 and rotor winding 10 are fed by a current $c$ from an amplifier generator 25, which current may be measured by an ammeter 26. The stator and rotor fluxes produced by current $c$ will produce a torque $c^2$ which is in a clockwise direction and opposed to the torque produced by the other windings. Thus, we have an instrument in which there is a torque $(a-b)(a+b)$ in one direction and a torque $c^2$ in the opposite direction.

As previously explained I have found that this is true when the rotor windings are in the positions shown with respect to the stator windings, that is, winding 11 at an angle to windings 15 and 16 and winding 10 at the same angle to winding 17. Hence, in such center position with the torques equal $(a-b)(a+b)=c^2$. This is true with different relative values of the currents, $a$, $b$ and $c$ so long as the equation is satisfied. If the $c^2$ torque be too small the device will turn in one direction away from the center torque position and if too large the device will turn in the opposite direction from the center torque position. Hence, I may adjust any one or all of the currents in the proper direction and proportions to bring the rotor back to the central position where the torques are equal when $(a-b)(a+b)=c^2$ and I may provide an indicator 27 on the shaft and use the ammeters 20, 24 and 26 to facilitate such adjustment.

I also may have the device control a regulator for one of the currents so as to tend to restore the balance of the torques and a return of the rotor 12 toward the central position with or without adjustment of one or both of the other currents. In the illustration I have shown an automatic regulator for the current $c$ which is supplied from the amplifier generator 25. The amplifier generator may be of the type described in United States Letters Patent No. 2,227,992, January 7, 1941. Such a machine is capable of large amplification and is quickly responsive to small variations in its field winding excitation. The machine 25 is represented as having a field winding divided into two parts 28 and 29. These field winding sections are reversely energized through rectifiers at 30 and 31 and a transformer 32 from an A.-C. source 33. Interposed in the connection between the center tap of the transformer secondary and the common lead to the rectifiers is the rotor winding 34 of a sensitive voltage regulator, the stator 35 of which is also supplied from the A.-C. source 33. The rotor of this regulator is rotated with shaft 13 of the quadrature winding torque balancing device previously described. The regulator produces zero voltage when its rotor is at right angles to the line of its stator terminals.

The effect of turning the rotor winding 34 in one direction is to raise the voltage on one rectifier 30 and lower it on the other rectifier 31 and when turned in the opposite direction the reverse voltage regulation occurs. Hence this provides a sensitive device for regulating the resultant excitation produced by field windings 28 and 29. The arrangement is such that turning of rotor 12 from a central position due to a too weak $c$ current in windings 17 and 18 increases such current and turning of rotor 12 in the opposite direction decreases the $c$ current and the $c^2$ torque. The torque required to turn or imposed by rotor winding 34 is made insignificant as compared to the torque of the quadrature winding torque device so that the regulator does not influence the true angular position of the rotor 12. Also, the amplification produced by amplifier 25 may be and preferably is large enough so that the angular regulating range of rotor 12 is only a few degrees from the central position where the balance torque equation holds true for a balanced torque condition. The error, if any, can be made negligible. The fact that the $c^2$ torque varies as the square of the $c$ current increases the sensitivity. Initial adjustment of the $c$ current to within the contemplated regulating range may be had as by independent adjustment of the field excitation of machine 25, for example, by adjustment of the center tap on the secondary of transformer 32. It will be noted that the manner of exciting the field winding of machine 25 by opposed field winding sections tends to make such excitation independent of voltage variations of the source 33.

At 36 is a radio antenna device and at 37 is a radio reception and range detector apparatus including a cathode ray indicator device responsive to radio reception known to the military authorities of the United States. This equipment is such that if the range detector is maintained in a certain adjustment which corresponds to the range (distance from the antenna to the target) the range detector is in correspondence. To maintain correspondence with an approaching target it is necessary to continuously change the adjustment at a rate which is called range rate.

For convenience, I will refer to the detector as being on the target when the indication at 37 is correct. In the application of my invention here described the current $c$ and the voltage of amplifier generator 25 are made proportional to the range rate and hence I provide a motor 38 for driving the range rate detector, the motor being so designed that when energized by the voltage of generator 25 it runs at a speed proportional to such voltage or to the current $c$.

The variations in the voltage of generator 25 are in the first instance determined by the variations of the currents $a$ and $b$ which are proportional to target velocity and observed angular velocity respectively. The angular velocity $b$ is known from direct observation and hence this current is kept adjusted to correspond. The actual velocity of the target corresponding to current $a$ is unknown but can be determined by a correct solution of the equation $(a+b)(a-b)=c^2$. It will be noted that the rheostat for adjusting the $a$ current is in the form of a potentiometer 19 on hand control shaft 40 which is connected in driving relation with the control of the range detector through a differential gear 39. This is not essential but simplifies the procedure which is as follows: With the apparatus in operation the range rate is modified by hand control at the same time adjusting current $a$ until the computed range rate represented by the current $c$ coincides with the observed range rate which is observed by noting the indication produced by the cathode ray oscillograph in 37. Each such change of current $a$ modifies the current $c$ and speed of motor 38 until a correct adjustment is arrived at. This will establish a value of current $a$ which represents the target velocity. If it is now assumed that the target velocity remains constant for the immediate future, we have established a correct and constant value of the current $a$ and the electric computer will proceed to solve the equation for future variations in the current $c$ which represents the range rate. This electric computer control will thus give a continuous and smooth performance furnishing reliable and continuously available data from which future range may be readily arrived at. The apparatus also performs the functions of the mechanical computer used in the past by integrating a series of observations and predicting future variations. Where, as here, the current $a$ is adjusted simultaneously with the manual adjustment of the radio range detector, it is of course necessary that the manual corrective adjustment of the $a$ current correspond to a corrective manual adjustment of the detector. Thus, if a corrective adjustment is required which would increase the range rate, the corresponding corrective manual adjustment of current $a$ should advance the range detector in the same direction in which it is driven by range rate motor 38.

In Fig. 5 I have represented a quadrature winding torque device having similar stator windings $a$ and $b$ in one axis cooperating with a rotor winding $c$ and similar stator windings $d$ and $e$ in the other axis cooperating with a rotor winding $f$ at right angles to winding $c$. All windings will be assumed to have the same number of turns. Currents may be caused to flow through the different windings and for convenience I will designate the currents flowing in the different windings by the corresponding reference characters. This provides a device for the solution of the general equation $(a+b)c=(d+e)f$ where currents $a$ and $b$ produce a stator flux in the same direction in one axis and cooperate with rotor winding $c$ to produce the torque $(a+b)c$ in one direction and currents $d$ and $e$ produce a stator flux in the same direction in the other quadrature axis and cooperate with rotor winding $f$ to produce a torque $(d+e)f$ in the opposite direction. When the two torques are equal with the rotor in a central rotary position shown, the system satisfies the equation $(a+b)c=(d+e)f$. The arrows adjacent the coils represent the direction of current flow for such equation.

From this basic equation and device can be derived a number of specific equation forms, the solution for which is provided by suitable connections. Thus, if we make the current in $c=a+b$ and the current in $f=d+e$ by using the connections of Fig. 6, we get the equation $$(a-b)(a+b)=(d-e)(d+e)$$

which equation may be transformed into or be derived from the equation $a^2-b^2=d^2-e^2$. If the current in winding $e$ be made zero in Fig. 6 the equation becomes $a^2-b^2=d^2$. If in the torque equation for Fig. 5 we make currents $c$ and $f$ equal, such equation may be written $a+b=d+e$. Or, if we make the currents in windings $b$ and $e$ in Fig. 5 each zero as by simply opening their circuits, we get $ac=df$. Again, in Fig. 5 we may make $c=1$ and $e=0$ and obtain the equation $a+b=df$. In Fig. 5 if the $a$ current be fed through only one-half the winding $a$ as by tap 46 the $a$ current becomes $\frac{1}{2}a$ in the equation. Additional windings and taps may be used on stator or rotor or both to provide an electrical computor for the solving of more complicated equations.

If, as represented in Fig. 6, a mechanical torque be added by means of a weight $w$ acting through a lever arm $r$, the equation for this device will be modified and become $$(a-b)(a+b)=(d-e)(d+e)\pm rw$$

depending upon the relative direction of the $rw$ torque.

Thus, we see that the regulator may be used for a variety of purposes. If we chose one of the several equations possible which gives the desired relationship for the solution of a certain problem or regulation in accordance with the solution, the device may be used for automatic regulation of one of the quantities in the chosen equation. Thus, in Fig. 5 the current $e$ is regulated by the device where a contactor 41 operated from the rotor 12 of the device upon any unbalance in either direction plays between and makes contact with stationary reversing contacts 42 and 43 of an electric motor 44 which operates a rheostat 45 in the energizing circuit of winding $e$.

All of the other quantities may be independent variables or some of them may be variables and others may be adjustable constants. The currents used in the windings of the quadrature torque calculator may be either direct or alternating. However, if alternating current is used, care should be taken to see that it is of the same phase and frequency.

In Fig. 7 I have represented a combination of two quadrature torque devices 49 and 50 with their rotors 46 and 47 mounted on the same shaft 48. It is assumed that the devices 49 and 50 are identical and that the stator windings in the horizontal axis with their quadrature rotor winding produce torques in the same direction in both devices and that the stator windings in the vertical axis with their quadrature rotor windings likewise produce torques in the same direction in both devices, but that the torques resulting from the horizontal axis stator windings are opposite to that of the torques resulting from the vertical axis stator windings. In the several circuits shown I have represented ammeters designated by reference characters $a$, $b$, $c$, $d$, $e$, and $f$, respectively, which will also be taken to represent the current flow in the corresponding circuits and the winding connected therewith. Arrows are provided to indicate the relative direction of current flow. It will be noted, for instance, that the currents $a$ and $b$ flow in opposite directions in the horizontal stator axis of device 49 and add in the quadrature axis of rotor 46 and also flow through one of the horizontal axis stator windings of the device 50 and through the quadrature winding of rotor 47. To assist in tracing the circuits and the torque values of the currents therein I have placed adjacent each winding or winding group the corresponding flux values produced in terms of the current designations. Thus the horizontal axis stator winding group of device 49 gives a torque flux which is designated $(a-b)$ and cooperates with the quadrature axis rotor winding which has the flux $a+b$ to produce a torque $(a-b)(a+b)$.

The torque equation for the combined device for the connections shown is $$(a-b)(a+b)+(a+b+e)(a+b)=(c+d)^2+(f-e)f$$

I have shown the combined device as controlling the ratio of the currents $e$ and $f$. That is, the torque amplifier control comprising contacts 41, 42 and 43 with the reversible motor 44 operates a double rheostat device having variable resistances 51 and 52 in the $f$ and $e$ circuits respectively and energized from a common source of supply 53. When the $f$ current is increased the $e$ current is decreased and vice versa. The examples given will suffice to illustrate the wide application of my invention.

In accordance with the provisions of the patent statutes, I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. An electric computer comprising inductively related stator and rotor members, a pair of similarly angularly displaced energizing windings of a known number of turns on both stator and rotor members with their flux axes lying in the same plane perpendicular to the axis of rotation, connections for energizing said windings with currents, the values of which represent computing factors and regulating means controlled in response to the rotary position of said rotor member for regulating one of said currents independently of all of the other exciting currents.

2. An electric computer comprising inductively related stator and rotor members, similarly angularly displaced energizing windings of a known number of turns on both stator and rotor members with their flux axes lying in a common plane perpendicular to the axis of rotation, connections for energizing said windings with currents, the values of which represent different computing factors and are subject to independent variation, means for regulating at least one of said currents independently of all of the other energizing currents, and means for indicating the angular position of said rotor.

3. An electric computer comprising inductively related stator and rotor members, similarly displaced energizing windings of a known turn relationship on both stator and rotor members the flux axes of all of said windings lying in the same plane perpendicular to the axis of rotation, connections for energizing said windings with currents the values of which represent computing factors, means for regulating at least one of said currents, and means for applying a mechanical torque to said rotor representing another computing factor.

4. Electrical computing apparatus comprising inductively related stator and rotor members, quadrature displaced energizing windings of a known number of turns on both stator and rotor members the flux axes of said windings lying in a common plane perpendicular to the axis of rotation, connections for energizing said windings with currents the values of which represent computing factors and are subject to independent variation for producing opposing torques which vary in proportion to the energizing currents which produce them and inversely with respect to each other for different rotor positions over a given rotor displacement range and regulating means including an amplifier for controlling at least one of said currents independently of all of the other energizing currents, said regulator being controlled by turning movement of said rotor due to an unbalance of said torques and in a direction to restore such balance.

5. Electrical computing apparatus for solving equations of the form $a^2-b^2=c^2$ where $a$, $b$ and $c$ are currents subject to independent variation representing computing values, said apparatus comprising inductively related stator and rotor members each having quadrature displaced energizing windings having their flux axes lying in the same plane perpendicular to the axis of rotation, energizing connections to said windings for producing quadrature stator fluxes proportional to $(a-b)$ and $c$ respectively and quadrature rotor fluxes proportional to $(a+b)$ and $c$ respectively and opposed rotor torques proportional to $(a-b)(a+b)$ and $c^2$ fluxes respectively, and means for varying at least one of said currents independently of all of the other of said currents until the $(a-b)(a+b)$ torque is equal to the $c^2$ torque.

6. Electrical computing apparatus for solving equations of the general form $(a+b)c=(d+e)f$, where $a$, $b$, $c$, $d$, $e$, and $f$ represent current values subject to independent variation used for computing purposes, said apparatus comprising inductively related stator and rotor members each having quadrature displaced energizing windings all with their flux axes in the same plane perpendicular to the axis of rotation, connections for energizing the windings on one member for producing quadrature fluxes therein proportional respectively to $(a+b)$ and $(d+e)$, connections for energizing the windings on the other member for producing quadrature fluxes therein proportional respectively to $c$ and $f$, said fluxes producing opposing torques which vary with different positions of the rotor according to sine waves with the waves displaced from each other by 90 degrees rotor rotation, and regulating means controlled by the rotor position for regulating the value of only one of the energizing currents to cause said opposing torques to be equal to $(a+b)c$ and $(d+e)f$ when the rotor is in substantially its center torque position.

7. Electrical computing apparatus comprising a plurality of electrical computers each comprising inductively related stator and rotor members, and each stator and rotor member having similarly angularly displaced energizing windings thereon of a known number of turns with their flux axes lying in the same plane perpendicular to the axis of rotation, a common shaft on which the rotor members of the several computers are secured, such that the central rotor torque position of each of the computers corresponds to the same rotary position of the shaft, connections for energizing the windings on the several members by currents, the values of which correspond to desired computing factors and in directions corresponding to the desired sign of such computing factors to produce opposing torques representing two sides of an equation, the factors of which correspond to such currents in said computers, and means for regulating the relative values of the energizing currents to obtain a balanced torque condition with the rotors in substantially their center torque positions whereby the balanced torque condition represents a correct balancing of such equation in terms of the value and direction of flow of such currents.

8. An electric computing device comprising inductively related stator and rotor members, each having energizing windings for producing fluxes in two different axes and in the same plane perpendicular to the axis of rotation, connections for energizing said windings with currents representing computing values and subject to independent variation to produce such fluxes, such that the values of the fluxes in the different winding axes of stator and rotor are similarly proportional to the algebraic sum of the corresponding energizing currents, the flux in one axis of the stator and the resultant flux of the rotor producing a torque in one direction and the flux in the other axis of the stator and the resultant flux of the rotor producing a torque in the opposite direction over the intended operating range of rotation of the rotor, said torques varying inversely with respect to each other over said range of rotor rotation for given energizing currents and are equal in one rotor position within said range when the product of the fluxes which produce one torque is equal to the product of the fluxes which produce the reverse torque, and means for regulating the value of the energizing current in one axis of at least one of said members independently of the current in the other axis of such member to produce a substantial balance of said reverse torques in a rotor position where the angle between the rotor winding axes coincides with the angle between the stator winding axes, whereby such balanced torque condition may be expressed by an equation in terms of the value and direction of the corresponding energizing currents.

9. Electric computing apparatus having stator and rotor members, inductively related windings on the stator and rotor, means for exciting the stator windings independently of each other to produce a pair of angularly displaced measurement fluxes, means for exciting the rotor windings independently of each other to produce a pair of similarly angularly displaced measurement fluxes, adjustable current regulating means for adjusting the value of one of said fluxes independently of all of the others, said rotor having a rotary position where one stator measurement flux reacts only with one rotor measurement flux to produce torque in one direction and where the remaining stator measurement flux reacts only with the remaining rotor measurement flux to produce torque in the opposite direction, and a range of rotor rotation on either side of such position where each of said stator measurement fluxes reacts with each of the rotor measurement fluxes to produce torques in addition to those previously mentioned, the turn relation of the stator and rotor windings for producing such measurement fluxes being known whereby the energizing currents for producing the measurement fluxes may be expressed in the form of an equation when the opposing torques are such as to bias the rotor to said position.

10. Electric computing apparatus having inductively related stator and rotor members with windings on both members, means for exciting the stator windings to produce a pair of quadrature displaced measurement fluxes which are subject to independent variation, means for exciting the rotor winding for producing a pair of quadrature displaced measurement fluxes, said rotor having a rotary balancing position where one stator measurement flux reacts only with one rotor measurement flux to produce torque in one direction and where the remaining stator measurement flux reacts only with the remaining rotor measurement flux to produce torque in the opposite direction, and a range of rotor rotation on either side of such rotor position where each stator measurement flux reacts with both rotor measurement fluxes to produce additional torques, the turn relation of the stator and rotor windings for producing such measurement fluxes being known whereby the energizing currents for producing the measurement fluxes may be expressed in the form of an equation when the opposing torques are such as to bias the rotor to said balancing position, and means for varying the exciting current to vary the measurement flux in one axis independently of the flux in the other axis in at least one of such members to cause the rotor to move to such rotary balancing position when not in such position.

ERNST F. W. ALEXANDERSON.

REFERENCES CITED

The following references are of record in the file of this patent:

UNITED STATES PATENTS

| Number | Name | Date |
|---|---|---|
| 1,857,452 | Hausman et al. | May 10, 1932 |
| 1,907,804 | Hausman et al. | May 9, 1933 |
| 1,162,475 | Gibson | Nov. 30, 1915 |
| 1,573,850 | Naiman | Feb. 23, 1926 |
| 1,646,634 | Sutherland | Oct. 25, 1927 |
| 1,677,378 | Albrecht | July 17, 1928 |
| 1,906,596 | Hoare | May 2, 1933 |
| 798,236 | Usener | Aug. 29, 1905 |

OTHER REFERENCES

Borden, Applications of the Electric Balance, etc., Instruments, December 1929.